US012755644B2

(12) United States Patent
Himeno

(10) Patent No.: US 12,755,644 B2
(45) Date of Patent: Oct. 6, 2026

(54) INDIVIDUAL LEARNING SYSTEM

(71) Applicant: IRYOU JYOUHOU GIJYUTU KENKYUSHO CORPORATION, Yame-gun Fukuoka (JP)

(72) Inventor: Shinkichi Himeno, Yame-gun Fukuoka (JP)

(73) Assignee: IRYOU JYOUHOU GIJYUTU KENKYUSHO CORPORATION, Fukuoka (JP)

( * ) Notice: Subject to any disclaimer, the term of this patent is extended or adjusted under 35 U.S.C. 154(b) by 0 days.

(21) Appl. No.: 18/011,026

(22) PCT Filed: Feb. 14, 2022

(86) PCT No.: PCT/JP2022/005526
§ 371 (c)(1),
(2) Date: Dec. 16, 2022

(87) PCT Pub. No.: WO2022/176786
PCT Pub. Date: Aug. 25, 2022

(65) Prior Publication Data
US 2023/0237925 A1 Jul. 27, 2023

(30) Foreign Application Priority Data
Feb. 19, 2021 (JP) ................................ 2021-025658

(51) Int. Cl.
*G09B 7/02* (2006.01)

(52) U.S. Cl.
CPC .................................... *G09B 7/02* (2013.01)

(58) Field of Classification Search
CPC .................................. G09B 7/00; G09B 7/02
See application file for complete search history.

(56) References Cited

U.S. PATENT DOCUMENTS

| | | | | |
|---|---|---|---|---|
| 6,039,575 A | | 3/2000 | L'Allier et al. | |
| 7,677,896 B1 * | | 3/2010 | Sonwalkar ............... | G09B 7/00 434/236 |
| 9,020,806 B2 * | | 4/2015 | Zweig .................. | G06F 40/237 434/156 |
| 11,651,702 B2 * | | 5/2023 | Lathrop .................. | G06N 3/08 434/322 |

(Continued)

FOREIGN PATENT DOCUMENTS

| | | |
|---|---|---|
| JP | H10207335 A | 8/1998 |
| JP | 20020492967 A | 2/2002 |

(Continued)

OTHER PUBLICATIONS

International Search Report issued on May 17, 2022, in corresponding International Application No. PCT/JP2022/005526; 6 pages.

(Continued)

*Primary Examiner* — Timothy A Musselman
(74) *Attorney, Agent, or Firm* — Maier & Maier, PLLC

(57) ABSTRACT

An individual learning system includes (i) attribute tag management configured to manage a list of attribute tags indicating attributes of examination questions and learning materials, (ii) attribute tag attachment configured to attach the attribute tags to the examination questions and the learning materials, (iii) attribute tag-attached examination question management configured to record and manage a list of combinations of the learning materials and the attribute tags attached to the examination questions and by the attribute tag attachment, and student-specific correct/incorrect answer attribute tag counting configured to, when examination questions extracted from the attribute tag-attached examination question management are conducted on students, count, for each of the students, attribute tags corresponding to incorrect answers and correct answers given to the examination questions by the student.

4 Claims, 10 Drawing Sheets

(56) References Cited

U.S. PATENT DOCUMENTS

| | | | | |
|---|---|---|---|---|
| 2003/0186209 | A1 | 10/2003 | Kamikawa et al. | |
| 2006/0046239 | A1* | 3/2006 | Allen | G09B 7/00 434/353 |
| 2009/0181365 | A1* | 7/2009 | Masuda | C12Q 1/6827 435/5 |
| 2011/0179389 | A1* | 7/2011 | Douen | G16H 70/60 707/769 |
| 2012/0196261 | A1* | 8/2012 | Kim | G09B 5/062 434/322 |
| 2014/0120516 | A1* | 5/2014 | Chiang | G09B 5/02 434/362 |
| 2014/0272889 | A1* | 9/2014 | Kulkarni | G09B 5/08 434/350 |
| 2016/0063881 | A1* | 3/2016 | Brinton | G09B 5/02 434/353 |
| 2019/0385471 | A1* | 12/2019 | Harris | G06Q 50/20 |

FOREIGN PATENT DOCUMENTS

| | | | |
|---|---|---|---|
| JP | 2002229431 | A | 8/2002 |
| JP | 2003280510 | A | 10/2003 |
| JP | 2005266451 | A | 9/2005 |
| JP | 2005321768 | A | 11/2005 |
| JP | 2006313275 | A | 11/2006 |
| JP | 2011018010 | A | 1/2011 |
| JP | 2012113059 | A | 6/2012 |
| JP | 2014059452 | A | 4/2014 |
| JP | 2014228957 | A | 12/2014 |
| JP | 5924654 | B2 | 5/2016 |
| JP | 2016191899 | A | 11/2016 |
| JP | 2018155871 | A | 10/2018 |

OTHER PUBLICATIONS

Office Action issued on Jun. 14, 2021, in corresponding Japanese Application No. 2021-025658; 12 pages.

Office Action issued on Aug. 25, 2021, in corresponding Japanese Application No. 2021-025658; 10 pages.

Office Action issued on Nov. 2, 2021, in corresponding Japanese Application No. 2021-025658; 96 pages.

Office Action issued on Feb. 28, 2022, in corresponding Japanese Application No. 2021-025658; 88 pages.

* cited by examiner

FIG. 3

ATTRIBUTE TAG
MANAGEMENT MEANS

| ATTRIBUTE TAG ID# | ATTRIBUTE TAG |
|---|---|
| 1 | TRAUMA |
| 2 | INFECTION |
| 3 | INFLAMMATION |
| 4 | NECROSIS |
| ⋮ | ⋮ |
| 2050 | BONE |
| 2051 | MUSCLE |
| 2052 | SKIN |
| 2053 | BLOOD VESSEL |
| 2054 | |
| ⋮ | ⋮ |
| 5001 | HEAD |
| 5002 | NECK |
| ⋮ | ⋮ |
| 5032 | HAND |
| ⋮ | ⋮ |

ATTRIBUTE TAG-ATTACHED LEARNING MATERIAL MANAGEMENT MEANS

| LEARNING MATERIAL ID# | ATTRIBUTE TAG | LEARNING MATERIAL ACCESS MEANS |
|---|---|---|
| 5035 | HAND FRACTURE (BONE) | http:// ------- -- ----- |
| 5085 | FRACTURE | http:// ------- -- ----- |
| 6086 | NECROTIC DISEASE | LEARNING MATERIAL/PLASTIC SURGERY/NECROSIS |
| ⋮ | ⋮ | ⋮ |

| ATTRIBUTE TAG ID# | 18 | 25 | 63 | 185 | ...... |
|---|---|---|---|---|---|
| INCORRECT ANSWER ATTRIBUTE TAG COUNT | 42 | 15 | 2 | 30 | ...... |
| CORRECT ANSWER ATTRIBUTE TAG COUNT | 3 | 38 | 15 | 5 | ...... |
| INCORRECT ANSWER RATIO(%) | 93 | 28 | 12 | 86 | ...... |

FIG. 8

SIMILAR QUESTION CREATION MEANS

ORIGINAL QUESTION

WHICH IS INCORRECT REGARDING CELL MEMBRANE LOCALIZATION?

1 RESTING POTENTIALS ARE NEGATIVE
2 ACTION POTENTIALS FOLLOW ALL-OR-NONE LAW
3 THERE IS REACTION PERIOD IMMEDIATELY AFTER ACTION POTENTIAL FIRES
4 POSITIVE POLARITY PART OF DEPOLARIZATION IS CALLED OVERSHOOT
5 POTASSIUM IONS MOVE FROM OUTSIDE CELL INTO CELL DURING DEPOLARIZATION

CORRECT ANSWER 5

SIMILAR QUESTION (CHANGING ORDER)

1 ACTION POTENTIALS FOLLOW ALL-OR-NONE LAW
2 POTASSIUM IONS MOVE FROM OUTSIDE CELL INTO CELL DURING DEPOLARIZATION
3 POSITIVE POLARITY PART OF DEPOLARIZATION IS CALLED OVERSHOOT
4 THERE IS REACTION PERIOD IMMEDIATELY AFTER ACTION POTENTIAL FIRES
5 RESTING POTENTIALS ARE NEGATIVE

CORRECT ANSWER 2

SIMILAR QUESTION (SWITCHING BETWEEN NEGATIVE AND POSITIVE FORMS)

1 RESTING POTENTIALS ARE NEGATIVE
2 ACTION POTENTIALS DO NOT FOLLOW ALL-OR-NONE LAW
3 THERE IS REACTION PERIOD IMMEDIATELY AFTER ACTION POTENTIAL FIRES
4 NEGATIVE POLARITY PART OF DEPOLARIZATION IS CALLED OVERSHOOT
5 POTASSIUM IONS MOVE FROM OUTSIDE CELL INTO CELL DURING DEPOLARIZATION

CORRECT ANSWER 1

FIG. 10

STUDENT ANSWER/LEARNING MATERIAL VIEW HISTORY MANAGEMENT MEANS

STUDENT ID# 1085

STUDENT ID# 356

| | DATE/TIME | EXAMINATION QUESTION# | ANSWER | CORRECT/ INCORRECT | LEARNING MATERIAL ID# | START DATE/TIME | END DATE/TIME |
|---|---|---|---|---|---|---|---|
| ANSWER PORTION | 2021/4/3 | 256 | 3 | 0 | | | |
| | 2021/4/3 | 683 | 3 | 0 | | | |
| | ⋮ | ⋮ | | | | | |
| | 2021/4/3 | 1085 | 3 | 0 | | | |
| LEARNING MATERIAL VIEW HISTORY PORTION | | | | | 2086 | 2021/4/3 11:02 | 2021/4/3 11:25 |
| | | | | | 3123 | 2021/4/3 14:56 | 2021/4/3 15:11 |
| | | | | | ⋮ | ⋮ | ⋮ |
| ANSWER PORTION | 2021/4/10 | 3062 | 3 | 1 | | | |
| | 2021/4/10 | 156 | 4 | 0 | | | |
| | ⋮ | ⋮ | | | | | |
| LEARNING MATERIAL VIEW HISTORY PORTION | | | | | 1856 | 2021/4/10 10:15 | 2021/4/10 10:30 |
| | | | | | ⋮ | ⋮ | ⋮ |

INDIVIDUAL LEARNING SYSTEM

TECHNICAL FIELD

The present invention relates to a system that provides optimal individual learning to students by providing or conducting learning materials or additional examinations corresponding to the level of understanding of the students on the basis of correct and incorrect answers of the students in an examination conducted at a school or the like.

BACKGROUND ART

Examinations are often conducted at schools and the like in order to measure the level of understanding based on learning.

Conventionally, it is common that a student manually gives answers to questions written on paper and a teacher manually grades the answers.

Recent improvements in the performance of computer systems have enabled students to give answers to electronically distributed examination questions using computer terminals and send them and enabled a server to automatically grade the answers.

It has also been a practice to previously attach attributes, such as the unit name or the level of difficulty, to examination questions and record them and to select proper questions or learning courses in accordance with the level of understanding of students obtained through previous examinations.

Background art literature relating to the present application includes the following.

CITATION LIST

Patent Literature

[Patent Literature 1] Japanese Unexamined Patent Application Publication No. Hei 10-207335

[Patent Literature 2] Japanese Unexamined Patent Application Publication No. 2002-49297

[Patent Literature 3] Japanese Unexamined Patent Application Publication No. 2005-321768

[Patent Literature 4] Japanese Patent No. 5924654

[Patent Literature 5] Japanese Unexamined Patent Application Publication No. 2014-228957

SUMMARY OF INVENTION

Technical Problem

An examination is means for measuring the level of understanding of a student.

It is assumed that a student has given an incorrect answer to a question. To give a correct answer to the question, the student needs to correctly understand multiple learning elements forming the question.

If learning elements insufficiently understood by the student, which are the cause of the incorrect answer, or, conversely, learning elements understood by the student are unknown, it is difficult to give, to the student, a proper guidance for guiding the student to the correct answer and to determine whether the student has sufficiently understood the learning elements as a result of the guidance.

Conventionally, students have been guided to repeatedly study textbooks or the like in a similar manner or solve the same questions many times.

However, causing the students to learn already understood learning elements many times are more likely to bore them and lead to a decrease in their motivation to learn. This also tends to reduce the amount of learning of the insufficiently understood learning elements, although such learning is all-important, and to leave the learning effects low.

The fundamental cause of this problem seems that conventional examinations have been conducted in order to only roughly grasp the general level of understanding of students and have not been conducted with a view of precisely grasping which learning elements each student was understanding sufficiently or insufficiently in answering individual questions.

The present invention has been made to solve the above problems with the background art, and an object thereof is to provide an individual learning system that when a student gives an incorrect answer to an examination question, precisely identifies learning elements insufficiently understood by the student, provides learning materials for causing the student to understand the learning elements, in a pinpoint manner, and allows an instructor to conduct, on the student, check examinations for determining whether the student has sufficiently understood the learning elements. Another object thereof is to early find students still having difficulty in learning and to prevent dropouts by causing instructors to intervene.

Solution to Problem

As means for accomplishing the above objects, an individual learning system includes (i) attribute tag management means configured to manage a list of attribute tags indicating attributes of examination questions and learning materials, (ii) attribute tag attachment means configured to attach the attribute tags to the examination questions and the learning materials, (iii) attribute tag-attached examination question management means configured to record and manage a list of combinations of the learning materials and the attribute tags attached to the examination questions and by the attribute tag attachment means, and student-specific correct/incorrect answer attribute tag counting means configured to, when examination questions extracted from the attribute tag-attached examination question management means are conducted on students, count, for each of the students, attribute tags corresponding to incorrect answers and correct answers given to the examination questions by the student.

In the individual learning system, the attribute tag management means includes attribute tag layered structure definition means configured to define a layered structure between attribute tags.

In the individual learning system, the attribute tag-attached examination question management means includes similar question creation means configured to create a similar question by changing the order of options of an original examination question, switching the options between negative and positive forms, or changing keywords in the options to change an correct answer to the original examination question.

In the individual learning system, the student-specific correct/incorrect answer attribute tag counting means includes insufficiently understood attribute tag narrow-down configured to obtain a ratio between incorrect answers and correct answers for each attribute tag and to narrow down attribute tags that a student is more likely to understand insufficiently.

The individual learning system includes attribute tag-attached learning material management means configured to record and manage a list of combinations of the learning materials and the attribute tags attached to the learning materials by the attribute tag attachment means and insufficiently understood attribute tag corresponding learning material extraction means configured to extract learning materials having attribute tags corresponding to the attribute tags that the student is more likely to understand insufficiently obtained by the insufficiently understood attribute tag narrow-down means.

The individual learning system includes insufficiently understood attribute tag understanding check examination question extraction means configured to, after the student learns the learning materials extracted by the insufficiently understood attribute tag corresponding learning material extraction means, extract different examination questions having the attribute tags that the student is more likely to understand insufficiently from the attribute tag-attached examination question management means in order to check whether the student has sufficiently understood the attribute tags that the student is more likely to understand insufficiently.

The individual learning system includes student answer/learning material view history management means configured to hold answer/learning material view histories of the students.

In the individual learning system, the student answer/learning material view history management means includes learning advancement difficult student detection means configured to detect a student having difficulty in advancing learning and to urge an instructor to intervene.

In the individual learning system, the student answer/learning material view history management means includes learning material view priority increase means configured to increase learning material presentation priority of learning materials corresponding to insufficiently understood attribute tags that have increased improvement of a correct answer ratio in insufficiently understood attribute tag understanding check examination questions compared to learning material presentation priority of different learning materials corresponding to the insufficiently understood attribute tags.

Advantageous Effects of Invention

The individual learning system includes the attribute tag management means and thus manages a list of attribute tags indicating attributes of examination questions and learning materials.

The individual learning system includes the attribute tag attachment means and thus attaches the attribute tags to the examination questions and the learning materials.

The individual learning system includes the attribute tag-attached examination question management means and thus records and manages a list of combinations of the learning materials and the attribute tags attached to the examination questions by the attribute tag attachment means.

The individual learning system includes the student-specific correct/incorrect answer attribute tag counting means and thus, when examination questions extracted from the attribute tag-attached examination question management means are conducted on students, counts, for each of the students, attribute tags corresponding to incorrect answers and correct answers given to the examination questions by the student.

The individual learning system includes the attribute tag layered structure definition means and thus define a layered structure between attribute tags in the attribute tag management means.

The individual learning system includes the similar question creation means and thus creates a similar question by changing the order of options of an original examination question, switching the options between negative and positive forms, or changing keywords in the options to change a correct answer to the original examination question.

The individual learning system includes the insufficiently understood attribute tag narrow-down means and thus obtains a ratio between incorrect answers and correct answers for each attribute tag and narrows down attribute tags that a student is more likely to understand insufficiently.

The individual learning system includes the attribute tag-attached learning material management means and thus records and manages a list of combinations of the learning materials and the attribute tags attached to the learning materials by the attribute tag attachment means.

The individual learning system includes the insufficiently understood attribute tag corresponding learning material extraction means and thus extracts learning materials having attribute tags corresponding to the attribute tags that the student is more likely to understand insufficiently obtained by the insufficiently understood attribute tag narrow-down means The individual learning system includes the insufficiently understood attribute tag understanding check examination question extraction means and thus, after the student learns the learning materials extracted by the insufficiently understood attribute tag corresponding learning material extraction means, extracts different examination questions having the attribute tags that the student is more likely to understand insufficiently from the attribute tag-attached examination question management means in order to check whether the student has sufficiently understood the attribute tags that the student is more likely to understand insufficiently.

The individual learning system includes the student answer/learning material view history management means and thus holds answer/learning material view histories of the students.

The individual learning system includes the learning advancement difficult student detection means and thus detects a student having difficulty in advancing learning and urges an instructor to intervene.

The individual learning system includes the learning material view priority increase means and thus increases learning material presentation priority of learning materials corresponding to insufficiently understood attribute tags that have increased improvement of a correct answer ratio in insufficiently understood attribute tag understanding check examination questions compared to learning material presentation priority of different learning materials corresponding to the insufficiently understood attribute tags.

BRIEF DESCRIPTION OF DRAWINGS

FIG. 3 is a diagram showing attribute tag management means.

FIG. 8 is a diagram showing similar question creation means.

FIG. 10 is a diagram showing student answer/learning material view history management means.

DESCRIPTION OF EMBODIMENTS

An individual learning system according to the present invention includes a server unit, a database, and terminals.

The server unit is a known computer unit and includes an arithmetic unit, a main memory, an auxiliary storage, an input unit, an output unit, and a communication unit.

The arithmetic unit, main memory, auxiliary storage, input unit, output unit, and communication unit are connected to each other through a bus interface.

The arithmetic unit includes a known processor capable of executing an instruction set. The main memory includes a volatile memory such as RAM capable of temporarily storing an instruction set.

The auxiliary storage includes a non-volatile data storage capable of storing an OS and programs.

The data storage may be, for example, an HDD or SSD.

The input unit is, for example, a keyboard.

The output unit is, for example, a display such as an LCD. unit includes a network interface connectable to a network.

The communication

The server unit has means such as attribute tag management means, attribute tag attachment means, attribute tag-attached examination question management means, student-specific correct/incorrect answer attribute tag counting means, attribute tag layered structure definition means, similar question creation means, insufficiently understood attribute tag narrow-down means, insufficiently understood attribute tag corresponding learning material extraction means, insufficiently understood attribute tag understanding check examination question extraction means, student answer/learning material view history management means, learning advancement difficult student detection means, and learning material view priority increase means.

The processor of the server unit performs these means.

The database according to the present invention may consist of the auxiliary storage of the server unit, or may consist of a different auxiliary storage independent of the server unit.

The database stores information handled by an individual learning system.

As with the server unit, the terminals according to the present invention each have the hardware configuration of a known computer.

The server unit, database, and terminals according to the present invention are able to communicate with each other through a network.

Figure 1:
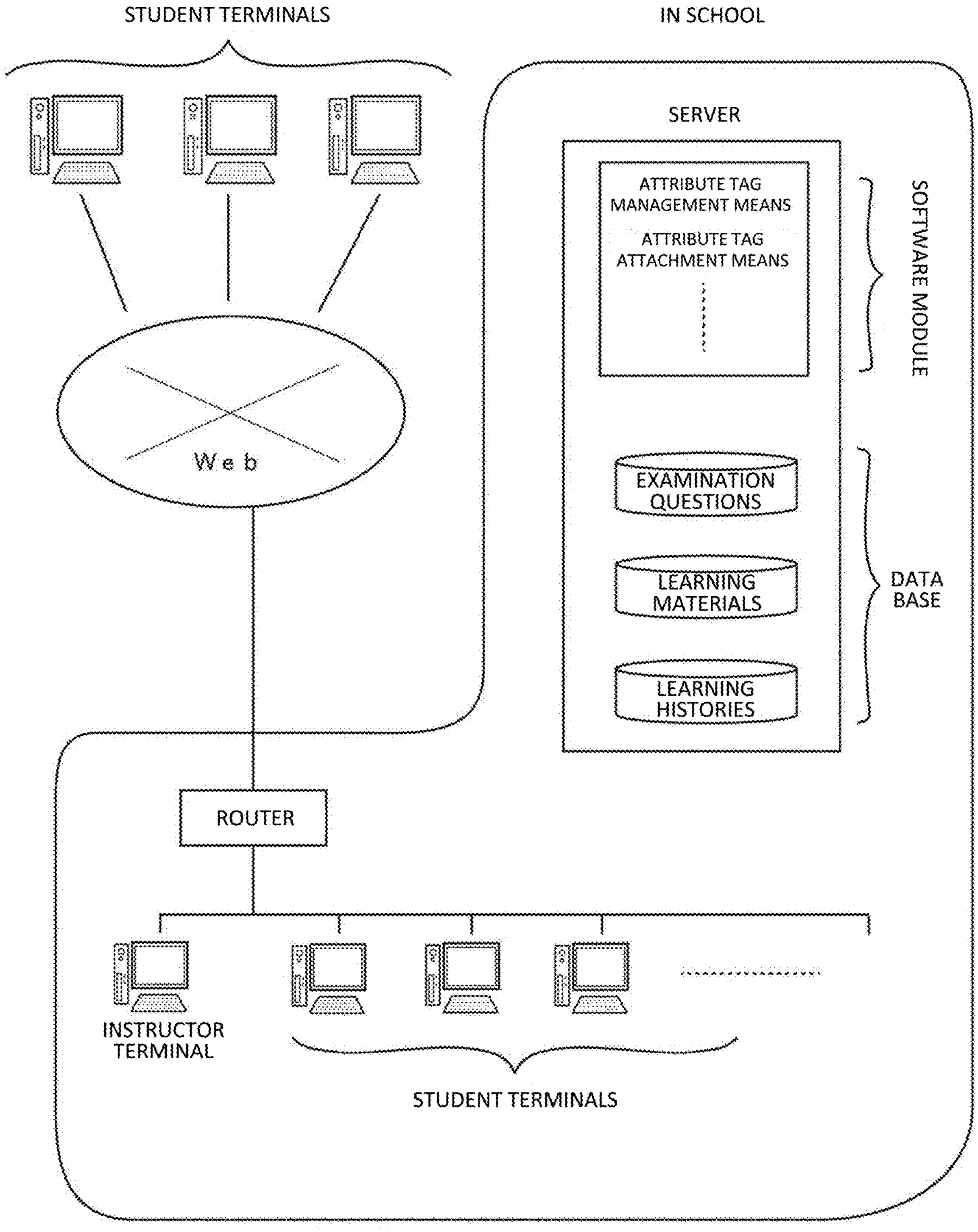
FIG. 1 is a schematic drawing of a system configuration according to the present invention.
Figure 2:
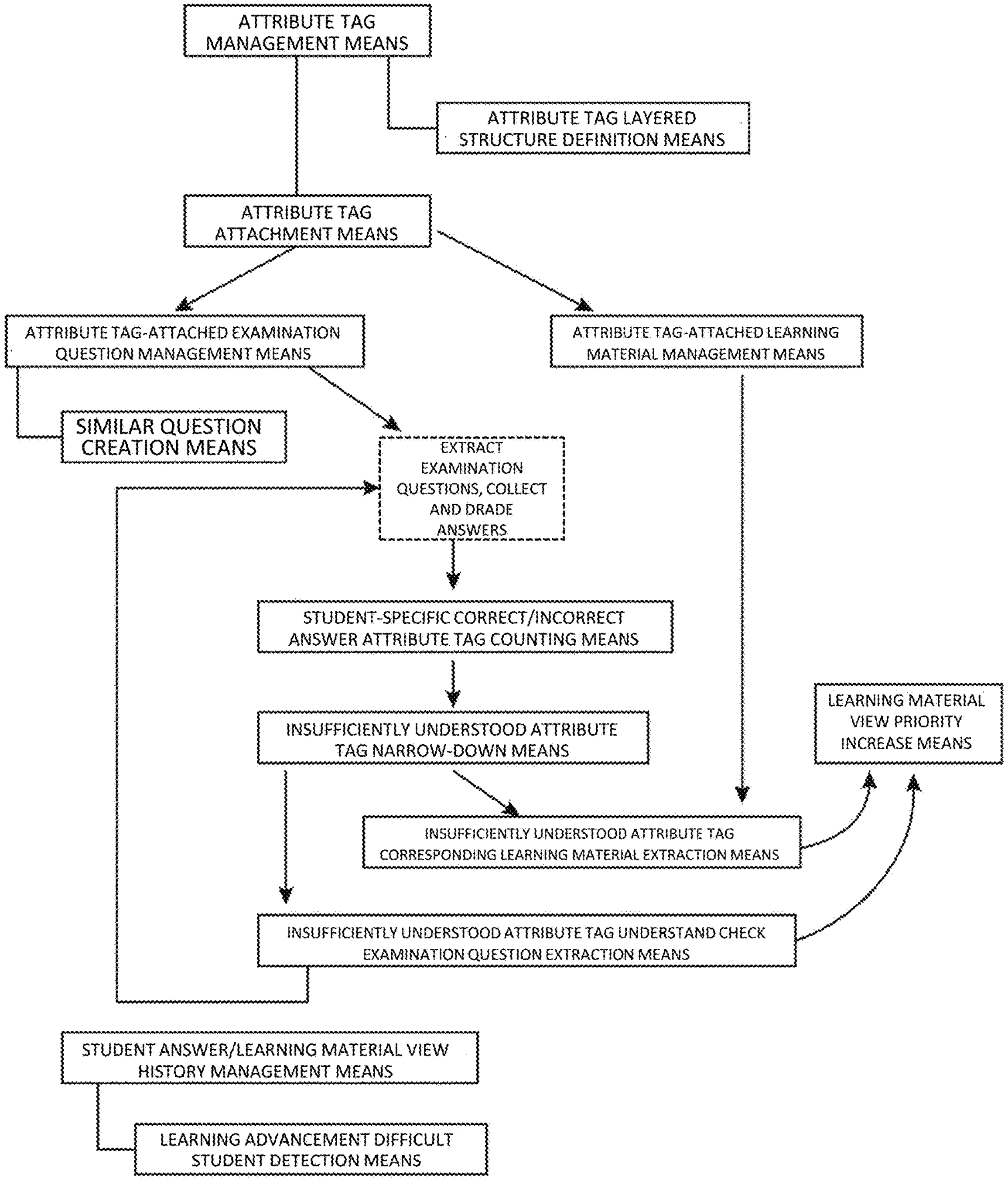
FIG. 2 is a diagram showing a software configuration.

FIGS. 1 and 2 are schematic drawings of a system configuration according to the present invention.

FIG. 1 is a drawing showing a hardware configuration. A server is storing software modules such as the attribute tag management means and a database in which examination questions, learning materials, student learning histories, and the like are recorded.

The server is connected to student terminals and instructor terminals through a local area network (LAN) or Web. Individual learning proceeds as follows: questions are transmitted from the server to the student terminals; answers are collected and graded; and then learning materials or additional examination questions are extracted for each student on the basis of the correct and incorrect answers and transmitted to the student terminals.

As will be described later, all learning does not need to be conducted online, and learning may partially include portions such as paper textbooks or paper examination questions, answer sheets, or practical examinations.

While a configuration in which the server is placed in a school or the like and the student terminals and instructor terminals are connected to the server through a LAN or the Web is shown in FIG. 1 for the convenience of description, a configuration in which part or all of a server is set on cloud and only terminal PCs connected to the Web are placed in a school or the like may be used.

FIG. 2 is a diagram showing a software configuration.

The attribute tag management means previously creates and manages a list of attribute tags properly indicating the content of each examination question or learning material.

If attribute tags form a layered structure, the attribute tag layered structure definition means previously defines the layered structure. Attribute tag managed by the attribute tag management means are attached to each of the examination questions and learning materials (attribute tag attachment means). A list of the attribute tag-attached examination questions and a list of the attribute tag-attached learning materials are recorded and managed (attribute tag-attached examination question management means and attribute tag-attached learning material management means).

With respect to the examination questions, similar questions having the same content but, for example, having different options and thus having different correct answers are previously created (similar question creation means) and thus rote memorization of the answers to the examination questions is invalidated.

An examination is conducted using examination questions extracted from the list of examination questions recorded and managed by the attribute tag-attached examination question management means.

While the examination questions may be extracted using attribute tags related to content as will be described later, examination questions would be often extracted in accordance with bibliographical criterion such as the n-th national examination questions or the level of difficulty.

With respect to execution of examinations and collection and grading of answers, it is most effective to electronically transmit examination questions to student terminals and to transmit answers to the server for grading, if possible. A configuration in which examination question sheets are distributed, answers are graded manually, and the grading results are transmitted from instructor terminals to the server is also included in the present invention. This configuration would be essential when performing grading of practical examinations, or the like. Scanning of mark sheets or answer sheets, or the like may be used together as necessary.

The obtained answers are checked against correct answers, a correct answer or incorrect answer to each examination question is recorded for each student in the answer portion of the student answer/learning material view history management means, and the attribute tags of the examination questions corresponding to the correct answers and incorrect answers to the examination questions are counted respectively (student-specific correct/incorrect answer attribute tag counting means).

While all the attribute tags corresponding to the incorrect answers may be regarded as insufficiently understood attribute tags, the number of insufficiently understood attribute tags is too large in some cases. In relation to setting of the options of the examination questions, the attribute tags corresponding to the incorrect answers may include already understood attribute tags.

In that case, learning materials having attribute tags corresponding to the already understood attribute tags would be assigned to the students and bore them, as well as would reduce assignment of learning materials to the insufficiently understood attribute tags, which is all-important.

To avoid the above situation, the attribute tags corresponding to the correct answers and incorrect answers given to the examination questions by each student are counted, the attribute tags corresponding to the incorrect answers are narrowed down to attribute tags indicating a high incorrect answer ratio as insufficiently understood attribute tags (insufficiently understood attribute tag narrow-down means).

The ratio of the incorrect answers to the correct answers may be set properly in accordance with the situation. By performing such narrow-down, attribute tags that correspond to an incorrect answer by chance due to a different attribute tag of the examination question in relation to the options but have already been understood can be removed.

Even simply obtaining a list of the attribute tags narrowed down as insufficiently understood attribute tags helps to determine the targets whose level of understanding should be increased and therefore the present invention is useful. Further, in the present invention, learning materials having attribute tags corresponding to the insufficiently understood attribute tags are presented to the applicable students in a pinpoint manner. Thus, learning effects can be expected to be obtained more efficiently.

The learning materials having attribute tags corresponding to the insufficiently understood attribute tags narrowed down by the insufficiently understood attribute tag narrow-down means are extracted from the attribute tag-attached learning material management means (narrowed-down insufficiently understood attribute tag corresponding learning material extraction means) and presented to the applicable students so that the students learn the learning materials.

Simultaneously, the learning materials are recorded in the learning material view history portion of the student answer/learning material view history management means.

After the students learn the learning materials, examination questions corresponding to the insufficiently understood attribute tags are extracted from the attribute tag-attached examination question management means and presented to the students in order to check whether the students have sufficiently understood the insufficiently understood attributes (insufficiently understood attribute tag understanding check examination question extraction means). If correct answers are given, it can be determined that the students have sufficiently understood the content of the attribute tags.

If incorrect answers are given again, presentation of learning materials and execution of check examinations described above are repeated. The range of insufficiently understood attribute tags is widened, and presentation of learning materials and check examinations are conducted. The insufficiently understood attribute tag understanding check examination questions and the answers thereto are also recorded in the answer portion of the student answer/learning material view history management means.

If some students do not sufficiently understand the insufficiently understood attribute tags even if presentation of the narrowed-down insufficiently understood attribute tag corresponding learning materials and check of understanding using the insufficiently understood attribute tag understanding check examination questions are performed many times using the student answer/learning material view history management means, or if the advancement of the learning process of some students is significantly behind that of other students, misunderstanding of those students or their lack of basic knowledge may be hidden.

In those cases, even if they continue learning in the current state, it would be difficult for them to obtain overall understanding.

It is useful that such students are detected (difficult learner detection means) and their difficulty is solved early by causing instructors to intervene using interviews or the like.

As seen above, the present invention provides the individual learning system that repeatedly present, to the students, examination questions and learning materials matching the different levels of understanding of the respective students and allows the students to do individual learning corresponding to the advancement of their levels of understanding.

FIG. 3 is a diagram showing the attribute tag management means. The attribute tag management means is managing a list of attribute tag ID # and attribute tags. Each attribute tag is a tag indicating an attribute of an examination question or learning material. In FIG. 3, tags related to disease types, the types of organs in which a disease is occurring, and sites at which a disease is occurring are listed.

The attribute of each examination question or learning material is represented as a combination of multiple applicable attribute tags. In some cases, an attribute tag obtained by mixing site, organ, disease type, or the like, such as "femoral neck fracture," may be used.

Figure 4:
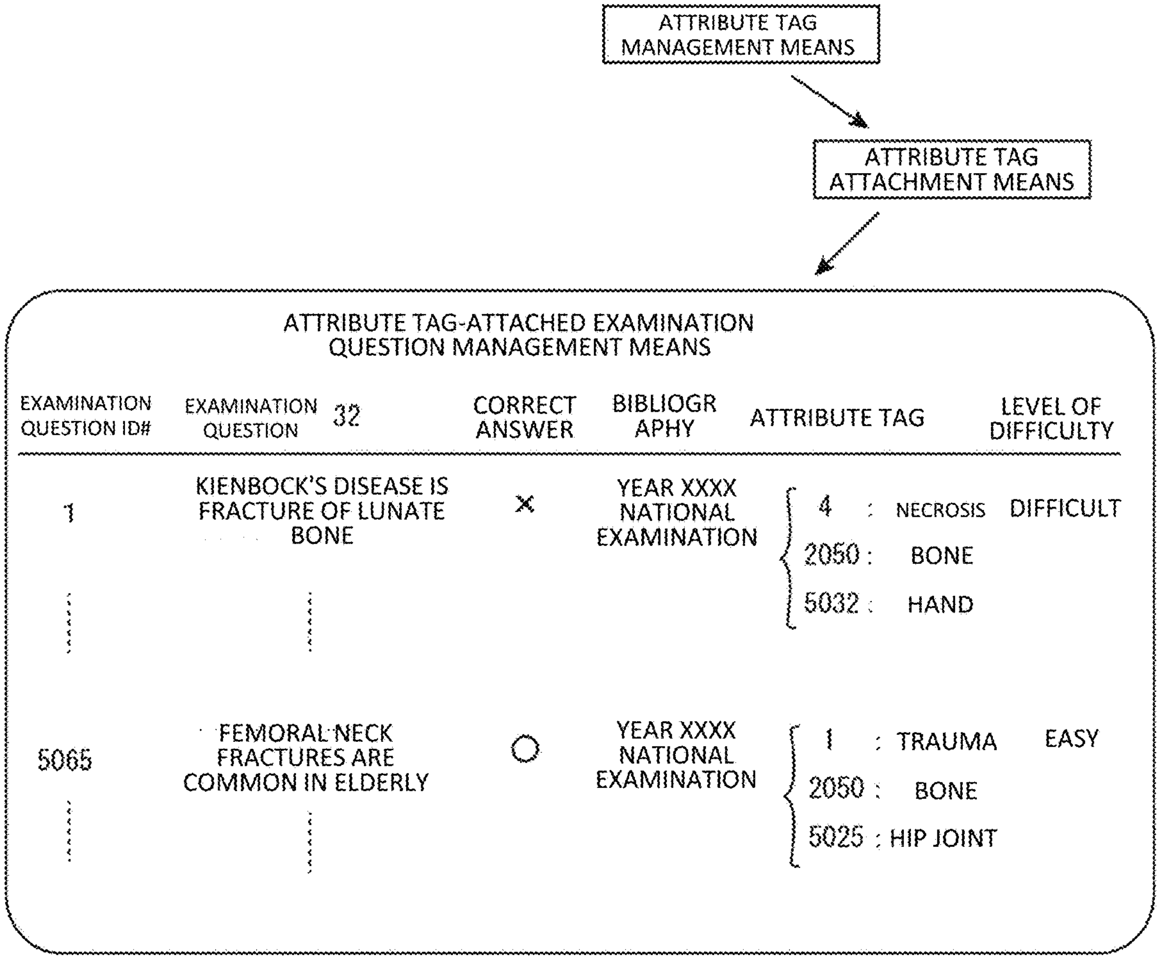
FIG. 4 is a diagram showing attribute tag-attached examination question management means and attribute tag attachment means.

FIG. 4 is a diagram showing the attribute tag-attached examination question management means and the attribute tag attachment means.

The attribute tag-attached examination question management means is managing a list of examination question ID #, examination question bodies, correct answers, bibliographical data, and attribute tags.

The bibliographical data indicates a set of examination questions serving as sources, such as the n-th national examination and the third grade final examination. The level of difficulty may be added to the bibliographical data. While the bibliographical data can be said to be a type of attribute, it does not indicate the attributes of the examination questions but rather indicates a bunch of managerial information on the questions, as seen in the present invention.

Attribute tags are obtained by selecting multiple proper attribute tags from the list in the attribute tag management means as necessary and copying them to the attribute tag field of the attribute tag-attached examination question management means (attribute tag attachment means). Here, the attribute tags may be copied to the attribute tag field by sequentially dragging and dropping them, or attribute tags whose check boxes are checked may be copied to the attribute tag field all at once.

While the attribute tags are described using text in FIG. 4 for the convenience of description, implementing the attribute tag-attached examination question management means using attribute tag ID # would be useful to save the storage area or improve search efficiency.

Figure 5:
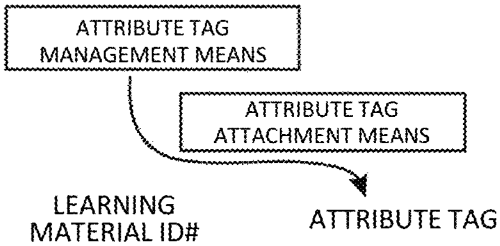
FIG. 5 is a diagram showing attribute tag-attached learning material management means and the attribute tag attachment means.

FIG. 5 is a diagram showing the attribute tag-attached learning material management means and the attribute tag attachment means.

FIG. 5 shows learning material ID #, learning material attribute tags, and learning material access means.

As with the attribute tags in the attribute tag-attached examination question management means, the learning material attribute tags are obtained by selecting an attribute tag(s) corresponding to the content of each learning material from the list in the attribute tag management means as necessary and copying the selected attribute tag(s) in the attribute tag field of the attribute tag-attached learning material management means (attribute tag attachment means).

While the learning materials are mostly slide collections using PowerPoint or the like, sound files, video images, websites describing an explanation, and the like, they may be paper textbooks. The learning materials only have to be access information that students can easily refer to.

While the learning material access means are preferably ones that allow students to access the target learning material with one click, such as a URL to the learning material on cloud, or specification of a file on an in-house server, they may be pages or paragraphs of paper textbooks or the like.

Note that attribute tags in the attribute tag field of some examination questions or learning materials may be manually inputted unique ones rather than ones selected from the list in the attribute tag management means and such attribute tags are also included in the present invention. However, those manually inputted attribute tags are not useful to narrow down insufficiently understood attribute tags on the basis of correct/incorrect answers and present learning materials in a pinpoint manner and therefore are unpreferable.

If it is necessary to provide such manually inputted unique attribute tags, they should be first added to the list in the attribute tag management means.

Figure 6:
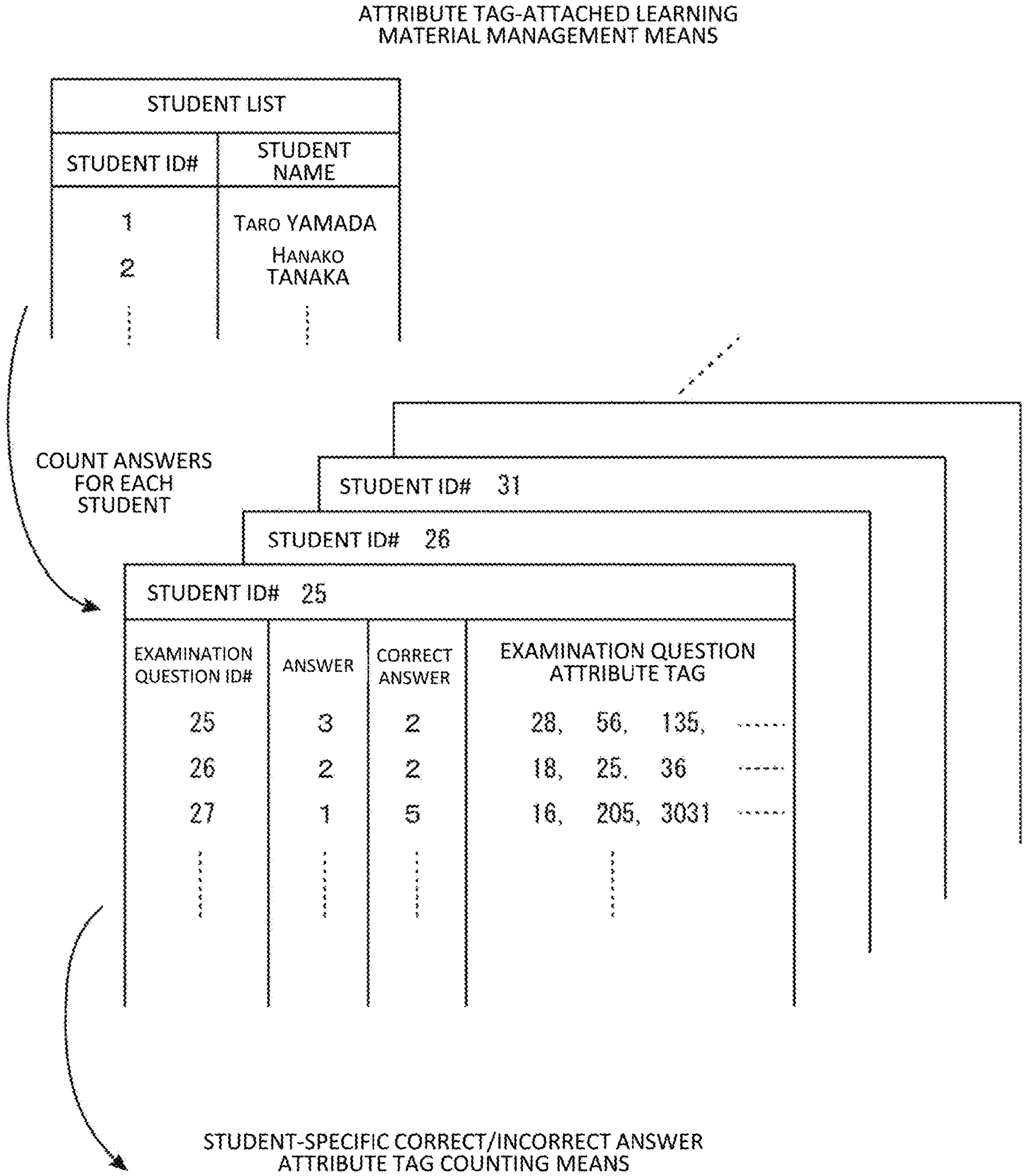
FIG. 6 is a diagram showing student-specific correct/incorrect answer attribute tag counting means and insufficiently understood attribute tag narrow-down means.

FIG. 6 is a diagram showing the student-specific correct/incorrect answer attribute tag counting means and the insufficiently understood attribute tag narrow-down means.

The students are managed using ID #.

After the students take a final examination or the like, a list of examination question ID #, answers and correct answers to the examination questions, and the attribute tags of the examination questions is created for each student ID #.

Based on a correct answer or incorrect answer given to each examination question, +1 is counted up in the incorrect answer or correct answer field of each of attribute tags corresponding to the correct answer or incorrect answer in the student-specific correct/incorrect answer attribute tag counting means.

When a student gives an incorrect answer to an examination question, this does not necessarily mean that understanding of all attribute tags related to the examination of the student is insufficient but rather often means that understanding of some attribute tags of the student is insufficient.

For this reason, causing the student to view learning materials corresponding to all attribute tags related to the incorrect answer may lead to forcing the student to view even learning materials corresponding to already understood attribute tags and boring the student.

To prevent this, the incorrect answer ratio of each attribute tag is obtained, attribute tags corresponding to an incorrect answer are narrowed down to attribute tags indicating a high incorrect answer ratio as insufficiently understood attributes (insufficiently understood attribute tag narrow-down means), and only learning materials corresponding to the insufficiently understood attribute tags are presented. The incorrect answer ratio serving as a criterion for narrow-down may be arbitrarily set by the instructor side or the student themself.

Figure 7:
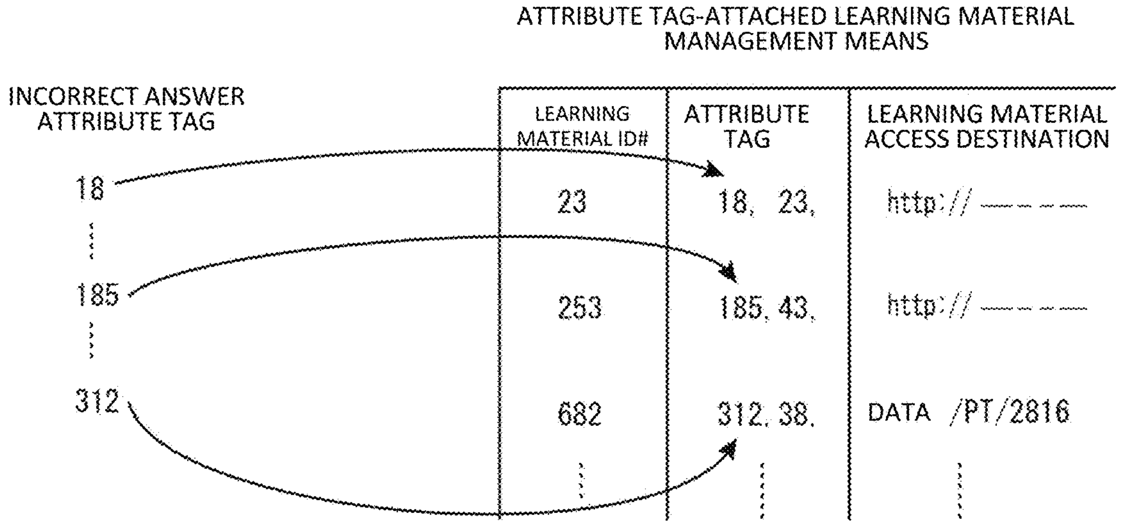
FIG. 7 is a diagram showing incorrect answer attribute tag corresponding learning material presentation means.

FIG. 7 is a diagram showing incorrect answer attribute tag corresponding learning material presentation means.

The incorrect answer attribute tag corresponding learning material presentation means extracts learning materials corresponding to the attribute tags of examination questions to which incorrect answers have been given or attribute tags narrowed down by the insufficiently understood attribute tag narrow-down means from the attribute tag-attached learning material management means. There are also learning materials on which multiple attribute tags are set.

While all learning materials corresponding to the above attribute tags may be extracted and presented, proper learning materials are selected when there are too many such learning materials.

Proper learning materials may be automatically selected by the system side, or a list of learning materials may be presented to the applicable student so that the student can select proper learning materials.

During the initial operation of the individual learning system according to the present invention, proper learning materials may be selected randomly. On the other hand, it is useful to use the student answer/learning material view history management means (to be discussed later) to increase, as more proper learning materials, the selection priority of learning materials that students have viewed and thus given correct answers to the questions of subsequent incorrect answer attribute tag understanding check examinations at higher ratios or learning materials that have obtained high evaluation feedbacks such as “helpful” from students who have viewed the learning materials (learning material view priority increase means).

FIG. 8 is a diagram showing the similar question creation means.

Various examinations such as in-class quizzes, final examinations, and national examinations are conducted at schools and the like.

Creating examination questions is said to require enormous time and effort since there are many conditions such as validity and reproducibility.

For this reason, newly creating all questions of each examination is almost impossible, and accumulated past questions are often reused.

However, if the same questions are repeatedly set, students would memorize only the correct answers without thinking about the content of the questions and answer the questions at a glance and their level of understanding would remain unknown.

For this reason, as shown in FIG. 8, it is useful to prevent students from reaching the correct answers unless they understand the content of the options, by properly selectively using methods such as changing the order of the options of the original question, switching the options between negative and positive forms, and changing the keywords in the options to change the correct answer of the original question. While changing the order of the options, or the like can be performed automatically when creating a similar question, switching between negative and positive forms or changing the keywords would be necessary to manually perform.

Figure 9:
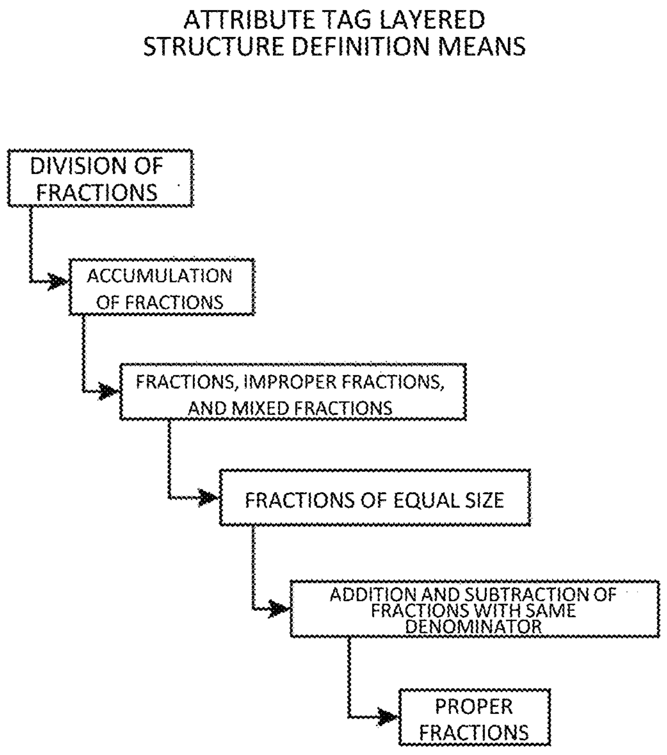
FIG. 9 is a diagram showing attribute tag layered structure definition means.

FIG. 9 is a diagram showing the attribute tag layered structure definition means.

In science and mathematics subjects, concepts forms a layered structure. Unless a student can understand a concept serving as a basis, the student would have difficulty in understanding a subsequent concept and piling up concepts.

FIG. 9 shows the layered structure of concepts for understanding fractions.

If a student gives an incorrect answer to an examination question, it is difficult to provide the student with proper learning materials corresponding to the level of understanding of the student as long as it is unknown from which layer in the layered structure the student has difficulty in understanding.

For this reason, attribute tags forming a layered structure as shown in FIG. 9 are previously provided to an examination question, a layer that a student has trouble in understanding is identified using the insufficiently understood attribute tag narrow-down means after the student gives an answer, and learning materials corresponding to the attribute tag of this layer are presented to the student in a pinpoint manner. Thus, the student can easily increases the level of understanding and return to the course.

FIG. 10 is a diagram showing the student answer/learning material view history management means.

Student-specific learning histories, such as answers to examination questions, views of learning materials corresponding to incorrect answers, and answers to incorrect answer attribute tag understanding check examination questions after viewing the learning materials, are recorded in the student answer/learning material view history management means.

As described above, it is possible to increase, as more proper learning materials, the selection priority of learning materials that have increased the correct answer ratio in incorrect answer attribute tag understanding check examination questions or learning materials that have obtained high evaluation feedbacks such as "helpful" from students who have viewed the learning materials (learning material view priority increase means).

Also, by using the learning advancement difficult student detection means that detects students who have difficulty in advancing learning such as those who have not been able to increase the correct answer ratio with respect to incorrect answer attribute tag understanding check examination questions or those who have viewed learning materials longer than other students and urges instructors to intervene, it is possible to prevent so-called "drop-outs."

The value, such as the rate of increase in the correct answer ratio or the length of the learning material view time, serving as a criterion for determining that a student has difficulty in advancing learning can be arbitrarily set by an instructor.

While an embodiment of the present invention has been described above, the specific configuration of the present invention is not limited to the embodiment. Design changes and the like in the embodiment are included in the present invention without departing from the spirit and scope of the invention.

The invention claimed is:

1. An individual learning system comprising:

(i) attribute tag management means configured to manage a list of attribute tags that indicate attributes of examination questions and learning materials and relate to disease types, the types of organs in which a disease is occurring, and sites at which a disease is occurring;

(ii) attribute tag attachment means configured to attach the attribute tags to the examination questions and the learning materials;

(iii) attribute tag-attached examination question management means configured to record and manage a list of combinations of the examination questions and the attribute tags attached to the examination questions by the attribute tag attachment means;

student-specific correct/incorrect answer attribute tag counting means configured to, when examination questions extracted from the attribute tag-attached examination question management means are conducted on students, count, for each of the students, attribute tags corresponding to incorrect answers and correct answers given to the examination questions by the student;

attribute tag-attached learning material management means configured to record and manage a list of combinations of the learning materials and the attribute tags attached to the learning materials by the attribute tag attachment means;

insufficiently understood attribute tag corresponding learning material extraction means configured to extract learning materials having attribute tags corresponding to the attribute tags that the student is more likely to understand insufficiently;

insufficiently understood attribute tag understanding check examination question extraction means configured to, after the student learns the learning materials extracted by the insufficiently understood attribute tag corresponding learning material extraction means, extract different examination questions having the attribute tags that the student is more likely to understand insufficiently from the attribute tag-attached examination question management means in order to check whether the student has sufficiently understood the attribute tags that the student is more likely to understand insufficiently;

student answer/learning material view history management means configured to hold answer/learning material view histories of the students; and incorrect answer attribute tag corresponding learning material presentation means, wherein the student-specific correct/incorrect answer attribute tag counting means is further configured to:

obtain a ratio of a number of incorrect answers to a total number of correct answers and incorrect answers for each attribute tag attached to the examination questions, and narrow down, from a plurality of attribute tags attached to an incorrectly answered examination question, attribute tags that a student is more likely to understand insufficiently according to the ratio, the incorrect answer attribute tag corresponding learning material presentation means is configured to present only learning materials corresponding to the insufficiently understood attribute tags narrowed down, and an incorrect answer ratio serving as a criterion for narrowing down is set by an instructor or the student themselves.

2. The individual learning system of claim 1, wherein the attribute tag management means further comprises:

attribute tag layered structure definition means configured to define a layered structure between attribute tags.

3. The individual learning system of claim 1, wherein the attribute tag-attached examination question management means further comprises:

similar question creation means configured to:

create a similar question by changing the order of options of an original examination question, switch the options between negative and positive forms, or change keywords in the options to change a correct answer to the original examination question.

4. The individual learning system of claim 1, wherein the student answer/learning material view history management means further comprises:

learning material view priority increase means configured to increase learning material presentation priority of learning materials corresponding to insufficiently understood attribute tags that have increased improvement of a correct answer ratio in insufficiently understood attribute tag understanding check examination questions compared to learning material presentation priority of different learning materials corresponding to the insufficiently understood attribute tags.

* * * * *